United States Patent

[11] 3,532,127

[72] Inventors Thomas H. Vogelsang, and
    Salvatore Bottone, Jr., Schenectady, N.Y.
[21] Appl. No. 679,771
[22] Filed Nov. 1, 1967
[45] Patented Oct. 6, 1970
[73] Assignee General Electric Company
    a corporation of New York

[54] VARIABLE FLUIDIC RESISTOR DEVICE
    16 Claims, 7 Drawing Figs.
[52] U.S. Cl. ............................................. 138/43,
                                      137/608, 137/614.11
[51] Int. Cl. ....................................... F15d 1/00,
                                                F15d 1/14
[50] Field of Search ............................. 138/39—40,
         41—45, 46; 251/118—128; 62/528; 335/61,
                                        62; 137/614.11

[56]         References Cited
         UNITED STATES PATENTS
1,918,959  7/1933  Culp ........................... 138/43
1,980,085  11/1934 Perry et al. ................. 138/43
2,012,004  8/1935  Hall et al. ................... 138/43X
2,236,084  3/1941  Brown ......................... 138/43
2,323,115  6/1943  Bryant ........................ 138/43
2,833,311  5/1958  Baldelli ...................... 138/43
3,069,126  12/1962 Randall ....................... 251/121
2,855,481  10/1958 Lindahl ....................... 335/61
3,323,774  6/1967  Wilson ........................ 251/125
3,406,266  10/1968 Herve ......................... 335/61
3,411,608  11/1968 Thoma ......................... 138/42X
1,899,251  2/1933  Zerk .......................... 138/41

2,021,079  11/1935 Mittendorf et al. ............. 138/42
2,118,290  5/1938  Black ......................... 138/42
2,118,295  5/1938  Crawford et al. ............... 138/42
2,506,179  5/1950  Taplin ........................ 138/43
2,784,741  3/1957  Parish ........................ 138/42
3,323,550  6/1967  Lee ........................... 138/39
3,375,855  4/1968  Deeks ......................... 251/127X
3,434,500  3/1969  Burrows ....................... 138/42
2,833,311  5/1958  Boldelli ...................... 138/43
2,840,096  6/1958  DuBois ........................ 138/43X
2,850,038  9/1958  Shabaker ...................... 138/43X
3,148,703  9/1964  Kachline ...................... 137/608
3,150,686  9/1964  Kachline ...................... 137/608

FOREIGN PATENTS
1,243,778  9/1960  France ........................ 138/42

Primary Examiner—Laverne D. Geiger
Assistant Examiner—Henry K. Artis
Attorneys—Paul A. Frank, Richard R. Brainard, Americus
    Mitchell, Frank L. Neuhauser, Melvin M. Goldenberg,
    Oscar B. Waddell and Louis A. Moucha ABSTRACT: A laminar flow restriction device for obtaining variable resistance to fluid flow therethrough. The device comprises a fluid tight structure of two members and a slotted laminate therebetween, the slots forming two spaced fluid flow passages. A bridging fluid flow passage is provided in one of the members for interconnecting the two spaced passages. Means are provided for varying the position of the bridging passage to thereby vary the effective length of the interconnected passages and thus vary the resistance to fluid flow therethrough.

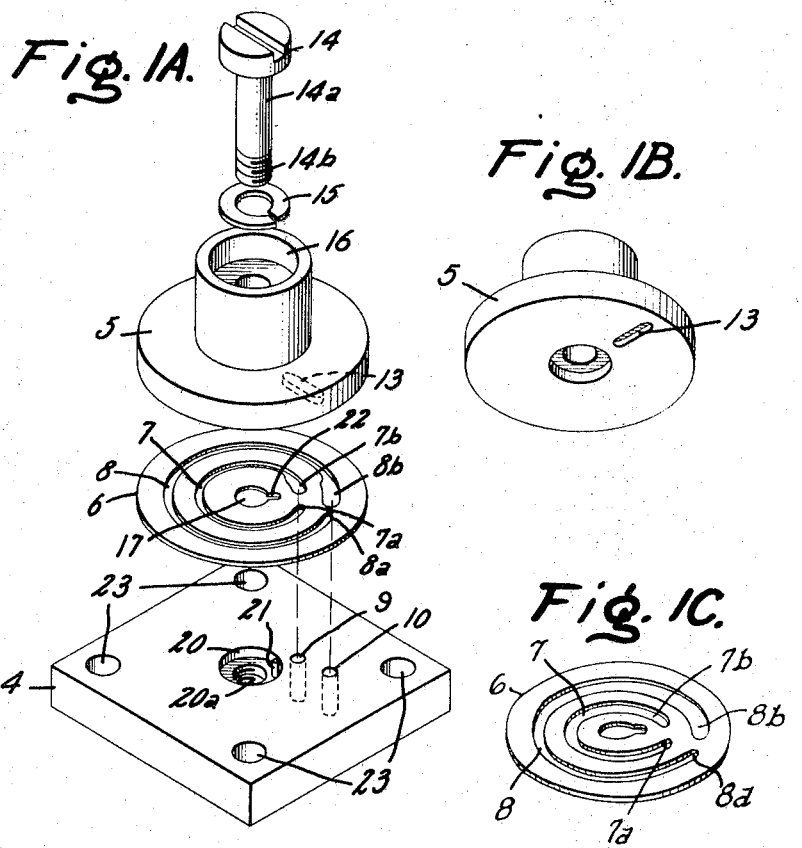
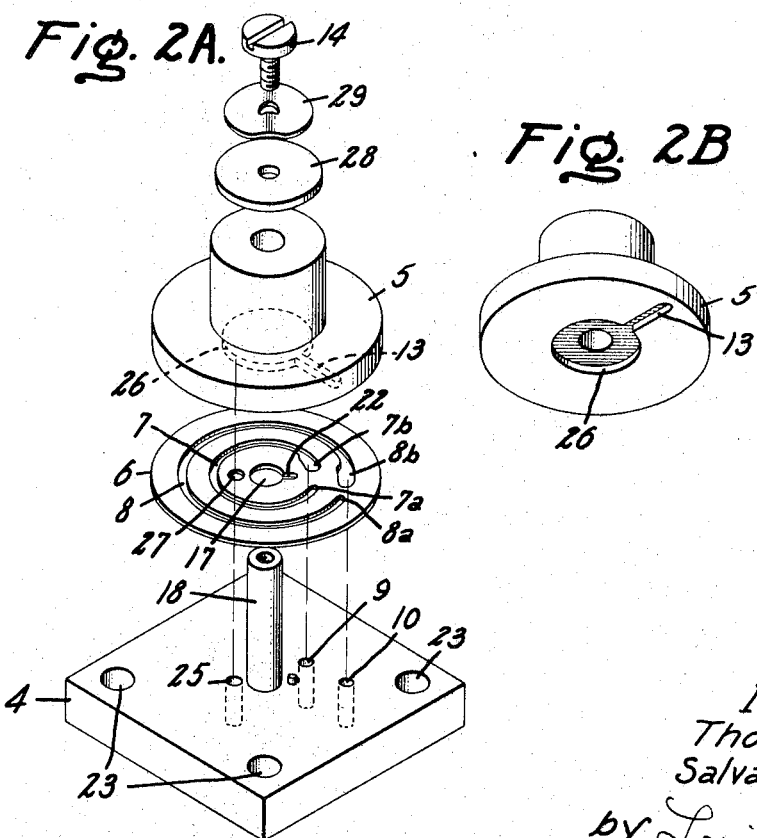

Patented Oct. 6, 1970

Inventors:
Thomas H. Vogelsang,
Salvatore Bottone, Jr.

by Louis A. Moucha

VARIABLE FLUIDIC RESISTOR DEVICE

Our invention relates to devices providing variable resistance to fluid flow, and in particular, to a device for obtaining variable resistance by means of varying the path length of capillary passages.

In pure fluid systems of the type employing the recently developed fluid control devices known as fluid amplifiers, a laminar flow restriction device providing a predetermined resistance to pressurized fluid flow is often an essential element. The need for these fluidic resistors is especially important for obtaining predetermined gains and time constants within fluidic control systems utilizing analog computing circuits such as the fluidic integrator, operational amplifier, and the like. The conventional means for varying the value of a fluidic resistance in a circuit is a substitution of resistors. Such technique is obviously time consuming and increases the risk of developing leaky connections in the fluidic circuit.

Therefore, the principal object of our invention is to provide a variable fluidic resistor device wherein an accurate resistance value may be varied without removing the device from the associated fluidic circuit.

Many of the analog type fluidic circuits are push-pull in configuration and operation, that is, utilize differential pressurized fluid input signals and provide differential output signals. Such push-pull circuits such as the operational amplifier and integrator require matched pairs of fluidic resistors in each pair of input and feedback networks, the resistance values remaining matched when varied.

Therefore, another object of our invention is to provide a device comprising two accurately ganged fluidic resistors whose resistances remain equal when varied.

A still further object of our invention is to provide a variable fluidic resistor device having a minimum number of parts for ease of fabrication, low manufacturing cost, and minimum risk of fluid leakage in operation.

Briefly stated, our invention comprises a fluid tight device including a base member, a top member and a laminate positioned therebetween. The laminate includes one pair of spaced slots formed therethrough for a single variable fluidic resistor embodiment and two pairs of slots for a ganged arrangement of two variable fluidic resistors. The bottom surface of the top member and the top surface of the base member enclose the laminate slots to thereby form separate fluid flow passages of the capillary type. Inlet and outlet passages are provided in the base member in fluid communication with first ends of the capillary fluid passages. The top member includes one (or two) slots in the bottom side thereof oriented for interconnecting the pair (or two pairs) of capillary fluid passages partially defined by the slots in the laminate. In a preferred embodiment, the laminate slots are concentric and the interconnecting slot in the top member is disposed radially therewith. Suitable means are provided for varying the position of the radial bridging slot along the lengths of the laminate slots thereby controllably varying the effective length of the interconnected pair of fluid passages and thus varying the resistance to pressurized fluid flow therethrough.

The features of our invention which we desire to protect herein are pointed out with particularity in the appended claims. The invention itself, however, both as to its organization and method of operation, together with further objects and advantages thereof, may best be understood by reference to the following description taken in connection with the accompanying drawings wherein like parts in each of the several figures are identified by the same character reference and wherein:

FIGS. 1a, 1b, 1c are a perspective view of two embodiments of a single variable fluidic resistor device prior to assembly and constructed in accordance with our invention;

FIGS. 2a, 2b are a perspective view of the variable resistor device shown in FIG. 1 and further including a center tap outlet.

Figure 3A:
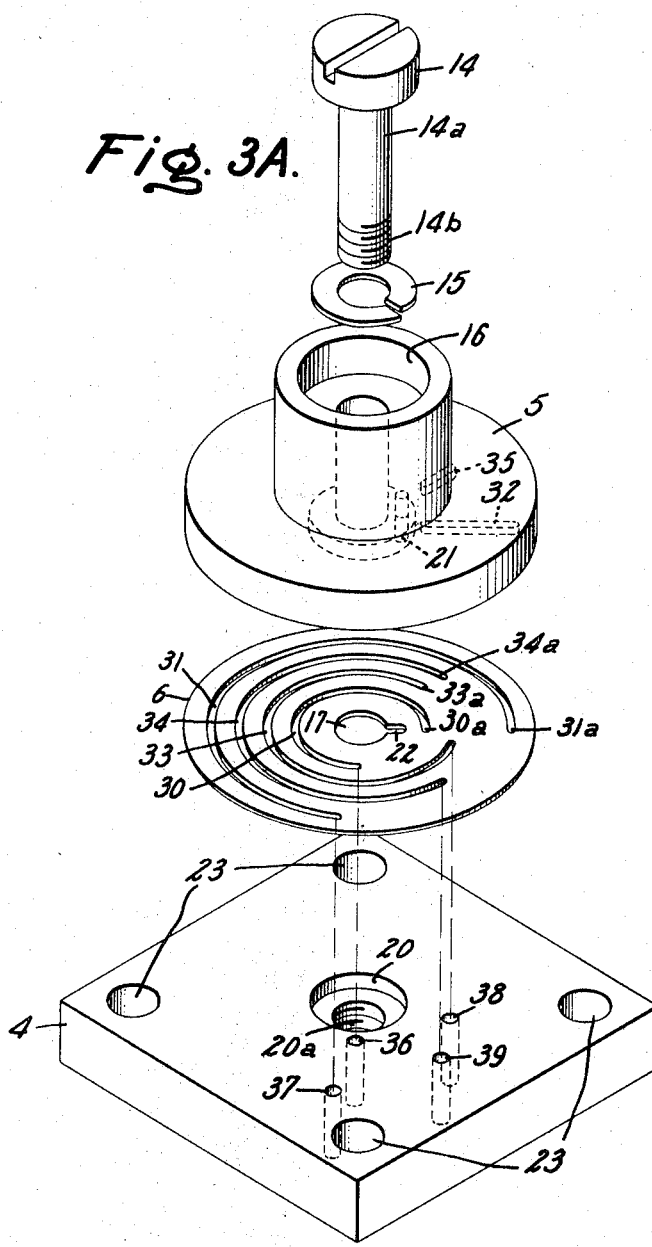
FIGS. 3a, 3b are a perspective view of a ganged two variable fluidic resistor device.

Referring now to FIG. 1a, there is shown a first embodiment of our invention, and in particular, a single variable fluidic resistor device wherein the elements thereof are in a superposed position to illustrate more clearly the elements prior to assembly. In particular, our device comprises a base member 4 which is the support for the device and also contains the inlet and outlet terminals thereof, a top member 5 which includes a means for varying the effective length of fluid flow passages, and laminate 6 which partially defines such passages. Laminate 6 is slotted therethrough, the slots 7 and 8 determining the sides of the fluid passages enclosed by the top surface of base member 4 and the bottom surface of top member 5. Laminate 6 is keyed to base member 4 and retained in fluid tight communication with the base and top members. It should be obvious that the device, upon assembly, may be oriented in any position, as desired. The various elements of our device are preferably constructed of metal, and as one example, the top and base members are fabricated from anodized aluminum and laminate 6 is fabricated from stainless steel. The materials from which the various elements are fabricated are dependent on the environment of device operation, and the materials must necessarily be nonporous to and nonreactive with the fluid medium employed, and be adapted for high precision machining to obtain accurately dimensioned slots within laminate 6 and well mating surfaces of members 4, 5 and 6 to prevent fluid leakage of the assembled device in operation. For ease and low cost of fabrication, the fluid passages comprising the fluidic resistor are rectangular or square in cross section, it being obvious that other cross-sectional shapes may be employed, if desired, at higher manufacturing costs.

In a preferred embodiment of our invention, as illustrated in FIG. 1a, laminate 6 and top member 5 are round and base member 4 is square in shape when looking down at the device. Obviously other shapes can be employed, as desired, or required by the particular application. Slots 7 and 8 in laminate 6 are concentric and are formed by any suitable method such as photoetching providing the necessary dimensional accuracy of the slots. A circular arrangement of the slots is preferred over straight slots to make the most effective use of an area (of laminate 6) having minimum overall dimensions and thus obtain maximum length passages in a device having minimum overall dimensions. The cross-sectional dimensions of slots 7 and 8 are sufficiently small, and the lengths are sufficiently long to obtain capillary type passages providing laminar flow restriction to the fluid flowing therethrough. The width of the slots are generally in the range of 0.004 to 0.060 inch and are generally greater than the depth (laminate thickness) dimension, the particular width, depth, and circular arc length thereof being determined by the range of resistances to pressurized fluid flow therethrough for which the particular device is constructed. The concentric slots 7 and 8, of necessity, are defined by circular arcs subtended by angles of less than 360°, and for ease of fabrication, have a maximum arc of approximately 320°. Slots 7 and 8 have respective first ends 7a and 8a thereof located along a common radial line emanating from the center of laminate 6 for reasons to be described hereinafter, and preferably have second ends 7b and 8b thereof spaced circumferentially from each other for convenience of spaced location of the inlet and outlet passages (terminals) 9 and 10 in base member 4.

Laminate 6 is keyed to base member 4 in any suitable manner (a dowel-keyway arrangement being illustrated as one example) to maintain such elements in a fixed position relationship wherein inlet and outlet passages 9 and 10 are respectively aligned and maintained in fluid communication with the second ends 7b and 8b of slots 7 and 8 as indicated by the dashed alignment lines. Passages 9 and 10 formed through base member 4 are of diameter at least as wide as slots 7 and 8, and preferably have a greater cross-sectional area such that the device resistance path is determined almost exclusively by the slots. In the most simplified resistor, slots 7 and 8 are each of equal and constant cross section to thereby provide a fluidic resistor having a linear weight flow versus pressure characteristic. The second ends 7b, 8b may be widened (as shown) for obtaining selected location of passages 9 and 10 in member 4 and for modifying the change from the smaller cross-sectional area of enclosed slots 7, 8 to the larger cross-sectional area of passages 9, 10, the widened ends 7b and 8b also permitting total length utilization of the narrow flow paths defined by slots 7 and 8, respectively. Our resistor device may also provide a nonlinear weight flow versus pressure characteristic and thereby operate as a function generator by forming slots 7 and 8 with variable cross section, the particular nonlinear characteristic being determined by the specific geometry of the slots. As one typical example of the variable cross section, the laminate 6 in FIG. 1c has slots 7, 8 formed therethrough with increasing widths in the direction toward second ends 7b, 8b.

Slots 7 and 8, hereinafter also referred to as fluid passages 7 and 8 (which are completely defined by the slots and the adjacent surfaces of members 4 and 5) are interconnected by means of a short, radially disposed slot (passage) 13 formed in the bottom surface of top member 5 and adapted to be in adjustable bridging relationship with respect to slots 7 and 8 to thereby vary the effective lengths thereof relative to passages 9 and 10. This slot 13 is shown more clearly in the underside view of member 5 in FIG. 1b. Slot 13 therefore provides a crossover passage for connecting passages 7 and 8 at a selected point along the circular lengths thereof. A rotational motion of top member 5 (also described as adjustable knob 5) may be obtained in any suitable manner, one convenient means being illustrated in FIG. 1a wherein knob 5 is capable of being manually rotated upon loosening of a hold down screw 14 aligned with the center axis of our device and threaded into a cylindrical hole 20 in base member 4. Hold down screw 14 comprises a stainless steel (as one example) cap screw having an upper unthreaded portion 14a of the shank extending into base member 4 and a lower threaded portion 14b being engaged by an internally threaded lower portion 20a of hole 20. In like manner, knob 5 is provided with a coaxial cylindrical hole 16, which however need not be threaded and may be counterbored at both ends. The upper counterbored portion (if employed) of hole 16 is adapted for receiving the head of screw 14 and a suitable means for insuring fluid tight assembly of our device, such as lock washer 15. Laminate 6 is also provided with a circular aperture 17 aligned with holes 16 and 20, and of diameter equal to the diameter of the noncounterbored portion of hole 16. Laminate 6 is further provided with a keyway 22, and base member 4 is provided with a dowel or pin 21 for keying these two members together and thereby maintaining them in fixed position relationship. The particular circumferential position of the keyway-pin insures fluid communication of inlet and outlet passages 9, 10 with the second ends 7b, 8b of passages 7 and 8. For ease in manufacture, dowel 21 is a pin force fitted into a suitably positioned hole in member 4 adjacent the hole 20. Pin 21 extends through keyway 22 and partially into the space formed by the lower counterbored portion of hole 16 to prevent relative motion between elements 4 and 6 while permitting knob 5 to rotate upon loosening of screw 14. It should be apparent that any other suitable means may also be employed for preventing relative rotational motion of elements 4 and 6.

The bottom surface of knob 5 and the top surface of base member 4 are machined to have a flatness preferably within .001 inch to insure a fluid tight mating of these surfaces with laminate 6 upon assembly of the device. Our assembled device is a fluid tight structure having elements 4, 5, 6 in alignment, laminate 6 keyed to base member 4, and passages 9 and 10 in communication respectively with the second ends 7b, 8b of passages 7 and 8. The bottom ends of passages 9 and 10 may be provided with suitable couplings for connection into a fluidic circuit in which our device is an element thereof. Finally, one or more holes 23 which may be threaded are provided through base member 4, adjacent the edges thereof for mounting the assembled device on a suitable support.

Upon assembly of the various elements hereinabove described, our fluidic resistor device provides a laminar flow restriction to pressurized fluid flow therethrough, the particular resistance to the fluid flow being determined by the dimensions of passages 7 and 8 and the relative location of bridging passage 13. The resistance value is varied by loosening screw 14, rotating knob 5 to a new setting corresponding to the new desired position of slot 13, and then tightening screw 14. Adjustable knob 5 may be provided, if desired, with a stop mechanism (not shown) to limit the rotational travel of knob 5 in one or both directions. Thus, knob 5 may be limited for counterclockwise rotation at the first ends 7a, 8a of passages 7 and 8 and may also be limited in the clockwise direction at the second end 8b of passage 8. Flipping laminate 6 over reverses the direction of knob 5 rotation for increasing and decreasing resistance. It is evident from the FIG. 1a drawing that a maximum resistance to fluid flow is obtained at the extreme counterclockwise setting of knob 5 (in which passage 13 is still in bridging communication with passages 7 and 8) since this provides the maximum effective length fluid flow path from inlet 9 to outlet 10 by including the total lengths of passages 7 and 8. The minimum resistance value is obtained at the extreme clockwise setting of bridging passage 13 wherein a minimum effective length fluid flow path between inlet 9 and outlet 10 includes the widened portion of passage 8. This minimum resistance may obviously be increased or decreased by varying the circumferential orientation of the second ends 7b, 8b of passages 7 and 8 with respect to each other. A near zero resistance is obtained by locating both such second ends (without widened portions) along a common radial line, such resistance being that of bridging passage 13 and any slight resistance in passages 9 and 10. A ratio of maximum-to-minimum resistance of at least 10:1 is readily available with our device, and ratios greater than 50:1 have been achieved. Since passages 7 and 8 have predetermined dimensions, the value of the resistance to fluid flow therethrough can be determined and the maximum and minimum values of resistance are thus known. In like manner, values of resistance between the maximum and minimum may readily be predetermined and various resistance values (or at least the extreme values or extreme knob 5 positions) may be indicated with an appropriate indicia indicator arrangement provided on base member 4 and knob 5, if desired. For small resistance values wherein the effective lengths of passages 7 and 8 are very short, such passages approach orifice type restrictions and the fluid flow therethrough may become nonlaminar, however, this is not a limitation on our invention.

Thus, it is evident that the relatively simple structure of our FIG. 1a embodiment provides a compact variable fluidic resistor device having a minimum manufacturing cost due to the small number of elements. Further, the compactness of the device and minimum number of parts provides a reliable device having a minimum possibility of fluid leakage. The accuracy of the resistance values obtained is very high and is obviously governed by the precision with which slots 7 and 8 are formed.

A second embodiment of our invention is illustrated in FIG. 2a, and further includes a center tap output terminal whereby the device provides the function of two variable resistors. The FIG. 2a device is comprised of the same type of elements as the FIG. 1a embodiment, the modification occurring in the addition of a center tap outlet passage (terminal) 25 passing through base member 4 and a cylindrical counterbored region 26 formed within the bottom surface of knob 5 in fluid communication with passage 13 (more clearly illustrated in the underside view in FIG. 2b). An additional aperture 27 is provided in laminate 6 in alignment with passage 25 and in fluid communication with cylindrical region 26. Pressurized fluid passing through bridging passage 13 is thus available at the center tap outlet 25. The first ends 7a, 8a of passages 7 and 8 are located on a common radial line on laminate 6. However, for purposes of obtaining a relatively accurate center tap the seconds ends 7b and 8b of necessity cannot be located along a common radial line. It is recognized that for concentric arrangement of passages 7 and 8 which are equal dimensioned and constant in cross section, only one particular setting of knob 5 can obtain an exact one half value of resistance at the center tap. A center tapped variable fluidic resistor device providing exact values of one half resistance for all settings of knob 5 is achieved by (1) forming at least one of slots 7 and 8 of predetermined variable cross sections or (2) orienting slots 7 and 8 in a straight, parallel arrangement rather than the concentric arrangement illustrated. The operation and passage effective length varying adjustment of the FIG. 2a embodiment is the same as the FIG. 1a and thus need not be further explained. A second means (equally applicable in FIGS. 1a and 3a) for supporting the various elements of the device in alignment and in fluid tight connection is illustrated in the FIG. 2a embodiment wherein a centrally located, hollow, internally threaded shaft 18 may be formed as an integral part of base member 4, or may be screwed or force fitted into the base member. A locking screw 14 is threaded into shaft 18 after passing through spring washer 29 and gasket 28 which mates with the topmost surface of knob 5.

Figure 3B:
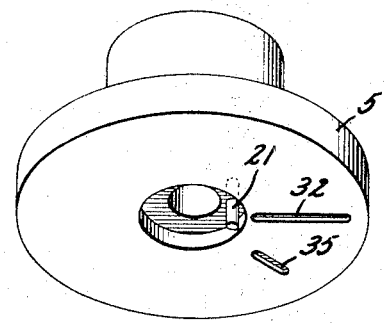

FIG. 3a illustrates a ganged two variable fluidic resistor device constructed in accordance with our invention. Again, the same type of elements are employed in this embodiment as in the FIGS. 1a and 2a single resistor embodiments, the chief distinction being an additional pair of concentric fluid passages in laminate 6, a second bridging passage in adjustable knob 5 for interconnecting the additional pair of passages, and an additional inlet and outlet passage in base member 4 in communication with this second pair of concentric passages. In particular, laminate 6 includes four concentric fluid passages of circular shape when viewed in a direction normal to the plane of laminate 6 and rectangular or square in cross section, the most inner and outer passages 30 and 31, respectively, being interconnected by means of a first bridging passage 32 formed in the bottom of adjustable knob 5 and the two intermediate passages 33 and 34 being interconnected by means of a shorter second bridging passage 35 in adjustable knob 5 (shown more clearly in the underside view in FIG. 3b). Adjustable knob 5 is keyed to laminate 6 to provide mutual rotation of knob 5 and laminate 6 relative to fixed base member 4. This distinguishing feature compared to the keyed laminate 6-base member 4 in the FIGS. 1a and 2a devices is necessary in order to retain a simple structure of the bridging passages and thereby achieve simplification in manufacture. Pin 21 is force fitted into a suitably positioned hole in the shoulder portion of a lower counterbored portion of hole 16 in knob 5. Hole 20 in member 4 is counterbored at the upper portion for providing clearance to pin 21. The four concentric fluid passages 30, 31, 33, and 34, in the most general case, each have equal widths and the combined total lengths of passages 30 and 31 equal the combined total lengths of passages 33 and 34. Under such circumstances, the ganged two-variable fluidic resistor device provides variable but equal resistances across each pair of terminals 36—37 and 38—39 in base member 4 for all settings of knob 5. The first ends 30a, 31a, of passages 30 and 31 are located along a first common radial line on laminate 6 and the corresponding first ends 33a, 34a of passages 33 and 34 are located along a second common radial line circumferentially spaced from the first. The second ends of passages 30, 31, 33, 34, in the most general case, are circumferentially spaced from each other. Bridging passage 32 is a radial slot which is in fixed fluid communication with the first ends 30a and 31a of passages 30 and 31 in the assembled device. In like manner, bridging passage 35 is a second radial slot, circumferentially spaced from slot 32, and is of shorter length since it is adapted to be in fixed fluid communication with the first ends 33a and 34a of the more closely spaced passages 33 and 34. Inlet and outlet terminals (fluid passages) 36—39 in base member 4, are shown in fluid communication with the second ends of passages 30, 31, 33 and 34, respectively, it being understood that these are the two maximum resistance value points of knob 5 travel. Counterclockwise rotation of knob 5 (and laminate 6 keyed thereto) decreases the effective lengths of bridged passages 30—31 and of bridged passages 33—34 in equal increments as viewed at the base member terminals 36—39 due to the relative motion of such terminals along the lengths of passages 30, 31, 33, 34.

Thus, the same effect is obtained in the FIG. 3a embodiment as in the FIGS. 1a and 2a embodiments, that of controllably varying the effective length of the interconnected fluid passages in laminate 6. In FIGS. 1a and 2a this effective length varying means is obtained by maintaining the laminate fluid passages and the inlet and outlet terminals in fixed relationship and varying the position of the bridging passage whereas in the FIG. 3a embodiment the position of the bridging passages is maintained in a fixed position relative to the laminate passages but the position of the inlet and outlet terminals relative to the laminate passages is varied. Obviously the keyed arrangement of elements 5 and 6 in the FIG. 3a embodiment may also be employed in the single variable fluidic resistor devices of FIGS. 1a and 2a, if desired. Also, the combined lengths of passages 30, 31 may be made unequal to the combined lengths of passages 33 and 34 to form a particular ratio of fluidic resistances. Further, slots 30, 31, 33, 34 may be formed with variable cross sections to obtain nonlinear weight flow versus pressure characteristics. Finally, inlet and outlet terminals 36, 37 may be disposed in alignment with first ends 30a, 31a of the corresponding passages to thereby obtain a ganged two-resistor device wherein rotation of knob 5 increases one resistance and decreases the other resistance an equal amount.

As a specific example of the dimensions employed in our variable resistor device, a single variable fluidic resistor device of the type illustrated in FIG. 1a having a maximum and minimum resistance to fluid flow of 75.75/3.31

$$\frac{\text{lb. sec.}}{\text{in.}^5}$$

is fabricated from a laminate 6 having a thickness of 0.004 inch and a diameter of 0.812 inch, fluid passages 7 and 8 are each approximately 1.5 inches long and 0.020 inch wide, bridging passage 13 has dimensions of 0.032 inch width, 0.015 inch depth and terminals 9, 10 have diameters of 0.076 inch.

From the foregoing description, it can be appreciated that our invention makes available a new variable fluidic resistor device which is comprised of a minimum number of parts for ease of fabrication and low manufacturing cost and minimum risk of fluid leakage in operation. The device may be employed in a fluidic circuit and the resistance varied without removing the device from the circuit since a change in resistance value is obtained by merely loosening a screw 14 and thence rotating knob 5 to the desired position of the requisite resistance value. The ganged variable fluidic resistor device embodiment is especially well adapted for use in circuits utilizing differential pressurized fluid signals since two very accurate fluidic resistances may be matched and varied in very accurately ganged relationship by our invention.

Having described three embodiments of our variable fluidic resistor devices, it is believed obvious that modification and variation of our invention is possible in the light of the above teachings. Thus, any number of means for retaining adjustable knob 5, laminate 6 and base member 4 in fluid type relationship may be employed, the screw arrangement illustrated herein being only one example of such retaining means. Further, the bridging passages and terminals may be respectively formed within the base member and adjustable knob, if desired. It is, therefore, to be understood that changes may be made in the particular embodiments as described which are within the full intended scope of our invention.

We claim:
1. A variable fluidic resistor device comprising:
   first fluid passage means for providing at least a first restriction to pressurized fluid flow therethrough;
   second fluid passage means spaced from said first passage means and coplanar therewith for providing at least a second restriction to pressurized fluid flow therethrough; and rotatable third fluid passage means disposed in adjustable bridging relationship with respect to said first and second fluid passage means for adjustably interconnecting said first and second fluid passage means in series circuit relationship along selected lengths thereof to thereby selectively vary the effective lengths thereof and thereby selectively vary the resistance to fluid flow therethrough upon predetermined rotation of said third means.

2. The variable fluidic resistor device set forth in claim 1 wherein:

said first fluid passage means comprises a first long narrow fluid passage having predetermined dimensions for providing a first laminar flow restriction;

said second fluid passage means comprises a second long narrow fluid passage having predetermined dimensions for providing a second laminar flow restriction; and said rotatable third fluid passage means comprises a third fluid passage in bridging relationship with respect to said first and second fluid passages, said third fluid passage adapted for variable positioning relative to said first and second fluid passages along selected lengths thereof to thereby provide a single variable fluidic resistor formed by the interconnected first and second passages.

3. The variable fluidic resistor device set forth in claim 2 and further comprising means in fluid communication with said third fluid passage for providing a center tap terminal in said device.

4. The variable fluidic resistor device set forth in claim 1 wherein:

said first fluid passage means comprises a first pair of spaced long narrow fluid passages each having predetermined dimensions;

said second fluid passage means comprises a second pair of spaced long narrow fluid passages each having predetermined dimensions; and said rotatable third fluid passage means comprises a fifth fluid passage in bridging relationship with respect to said first pair of passages and a sixth fluid passage in bridging relationship with respect to said second pair of passages, and further comprising means for simultaneously controllably varying the positions of said fifth and sixth passages relative to said first and second pairs of passages along the lengths thereof to thereby provide a pair of ganged variable fluidic resistors formed by the interconnected first pair and interconnected second pair of passages.

5. The variable fluidic resistor device set forth in claim 1 wherein said first and second fluid passage means having equal dimensions.

6. The variable fluidic resistor device set forth in claim 1 wherein said first and second fluid passage means having unequal dimensions.

7. The variable fluidic resistor device set forth in claim 1 wherein said first and second fluid passage means are each of constant cross section to provide a variable fluidic resistor device having a linear weight flow versus pressure characteristic.

8. The variable fluidic resistor device set forth in claim 1 wherein said first and second fluid passage means are each of variable cross section to provide a variable fluidic resistor device having a nonlinear weight flow versus pressure characteristic, the particular nonlinear characteristic being determined by the specific geometry of said first and second fluid passage means.

9. The variable fluidic resistor device set forth in claim 1 wherein said first and second fluid passage means are each of circular shape.

10. The variable fluidic resistor device set forth in claim 9 wherein said first and second fluid passage means are disposed in concentric relationship.

11. The variable fluidic resistor device set forth in claim 10 wherein said rotatable third fluid passage means is disposed radially in communication with said first and second fluid passage means.

12. The variable fluidic resistor device set forth in claim 1 wherein said first and second fluid passage means are rectangular in cross section.

13. A variable fluidic resistor device comprising:

a first member provided with at least first and second spaced long narrow slots therethrough defining the sides of at least one pair of high resistance fluid flow passages each being rectangular in cross section;

a second member provided with at least first and second spaced low resistance fluid flow passages defining inlet and outlet passages of said device, said inlet and outlet passages in respective communication with said at least first and second long narrow slots;

a third member provided with at least one short slot in a first surface thereof, said first member retained between said second and third members in fluid tight relationship and oriented for having said at least one short slot in fluid communication with said at least first and second long narrow slots for interconnection thereof; and means for varying the position of at least one of said first, second and third members relative to the other members to thereby vary the position of said short slot along the lengths of said long narrow slots and thereby vary the effective lengths of the interconnected said at least first and second long narrow slots to controllably vary the resistance to pressurized fluid flow therethrough.

14. The variable fluidic resistor device set forth in claim 13 wherein:

said at least first and second long narrow slots in said first member comprising a pair of concentric long narrow circular disposed slots therethrough defining the sides of a pair of high resistance concentric fluid flow passages;

said at least first and second fluid flow passages in said second member comprising a pair of fluid flow passages defining an inlet and outlet passage of said device, said inlet and outlet passage in respective fluid communication with first ends of a first and second of said pair of concentric long narrow slots;

said at least one short slot in said third member comprising one short slot oriented radially relative to said pair of concentric long narrow slots and in interconnecting relationship therewith; and said position varying means comprising means for rotating said third member relative to said first and second members to provide variable positioning of said short slot along the lengths of said pair of concentric long narrow slots and thereby varying the effective lengths thereof to provide a variable fluidic resistor.

15. The variable fluidic resistor device set forth in claim 13 wherein:

said at least first and second long narrow slots in said first member comprising two pairs of concentric long narrow circular disposed slots therethrough defining the sides of two pairs of high resistance concentric fluid flow passages;

said at least first and second fluid flow passages in said second member comprising four fluid flow passages defining two pairs of inlet and outlet passages of said device;

said at least one short slot in said third member comprising first and second short slots each oriented radially relative to said concentric long narrow slots and circumferentially spaced from each other, a first of said short radial slots in fluid communication with first ends of a first pair of said concentric long narrow slots and a second of said short radial slots in fluid communication with first ends of a second pair of said concentric long narrow slots; and said position varying means comprising means for rotating said first and third members relative to said second member to provide variable positioning of said inlet and outlet passages along the lengths of said concentric long narrow slots and thereby varying the effective lengths thereof to provide a ganged arrangement of two variable fluidic resistors.

16. The variable fluidic resistor device set forth in claim 13 wherein said long narrow slots each have a width in the range of 0.004 to 0.060 inch and a depth less than the width dimension to obtain the rectangular cross section high resistance fluid flow passages.